US007668783B2

(12) United States Patent
Kim et al.

(10) Patent No.: US 7,668,783 B2
(45) Date of Patent: Feb. 23, 2010

(54) SYSTEM AND METHOD FOR PROVIDING RENTAL SOFTWARE, AND RENTAL SOFTWARE PROVIDING SERVER AND WIRELESS TERMINAL THEREOF

(75) Inventors: Ju-Wan Kim, Daejon (KR); Jung-Sook Kim, Seoul (KR); Jeong-Dan Choi, Daejon (KR); Byung-Tae Jang, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 676 days.

(21) Appl. No.: 11/191,592

(22) Filed: Jul. 28, 2005

(65) Prior Publication Data

US 2006/0129494 A1    Jun. 15, 2006

(30) Foreign Application Priority Data

Dec. 13, 2004    (KR)    ...................... 10-2004-0105003

(51) Int. Cl.
  *G06F 21/00*    (2006.01)
(52) U.S. Cl. ....................................... 705/57
(58) Field of Classification Search ............. 705/50–54; 702/186; 709/201–244; 726/1–21
See application file for complete search history.

(56) References Cited

U.S. PATENT DOCUMENTS

| | | | | |
|---|---|---|---|---|
| 7,058,691 | B1* | 6/2006 | Yu et al. ..................... | 709/207 |
| 7,281,245 | B2* | 10/2007 | Reynar et al. ................ | 717/173 |
| 2002/0052942 | A1* | 5/2002 | Swildens et al. ............. | 709/223 |
| 2002/0069037 | A1* | 6/2002 | Hendrickson et al. ....... | 702/186 |
| 2003/0084145 | A1* | 5/2003 | Ramachandran et al. ..... | 709/224 |
| 2003/0135467 | A1* | 7/2003 | Okamoto ...................... | 705/52 |
| 2004/0107368 | A1* | 6/2004 | Colvin ......................... | 713/202 |

FOREIGN PATENT DOCUMENTS

| | | |
|---|---|---|
| JP | 2000-250803 A | 9/2000 |
| JP | 2001-154983 A | 6/2001 |
| KR | 10-2000 57127 | 9/2000 |
| KR | 2002-0023589 | 3/2002 |
| KR | 10-2003 30050 | 4/2003 |
| KR | 1020030030050 A | 4/2003 |
| KR | 1020040025195 A | 3/2004 |
| KR | 1020060018354 A | 3/2006 |

OTHER PUBLICATIONS

Genetic algorithms in the framework of Markov's constructive mathematical logic Rajan, E.G.; Rao, P.M.; Swamy, V.V.N.; Mukarramuddin, K.; Anantha, Y.; Mohan, M.M. Systems, Man and Cybernetics, 1995. Intelligent Systems for the 21st Century., IEEE International Conference on vol. 1, Oct. 22-25, 1995 pp. 223-228 vol. 1 .*

* cited by examiner

*Primary Examiner*—Andrew J. Fischer
*Assistant Examiner*—Calvin K Cheung
(74) *Attorney, Agent, or Firm*—Ladas & Parry LLP

(57) ABSTRACT

A rental software providing system and a method thereof, and its rental software providing server and a wireless terminal are disclosed. The rental software providing system using a prefetching scheme includes: a wireless terminal for notifying a network connection state, and a hardware state of the wireless terminal to a rental software providing server in order to perform the prefetching scheme; and a rental software providing server for prefetching partial programs of a rental software to be used in the wireless terminal by using a prefetching managing unit and a pattern analyzer and transmitting the prefetched partial programs to the wireless terminal.

7 Claims, 4 Drawing Sheets

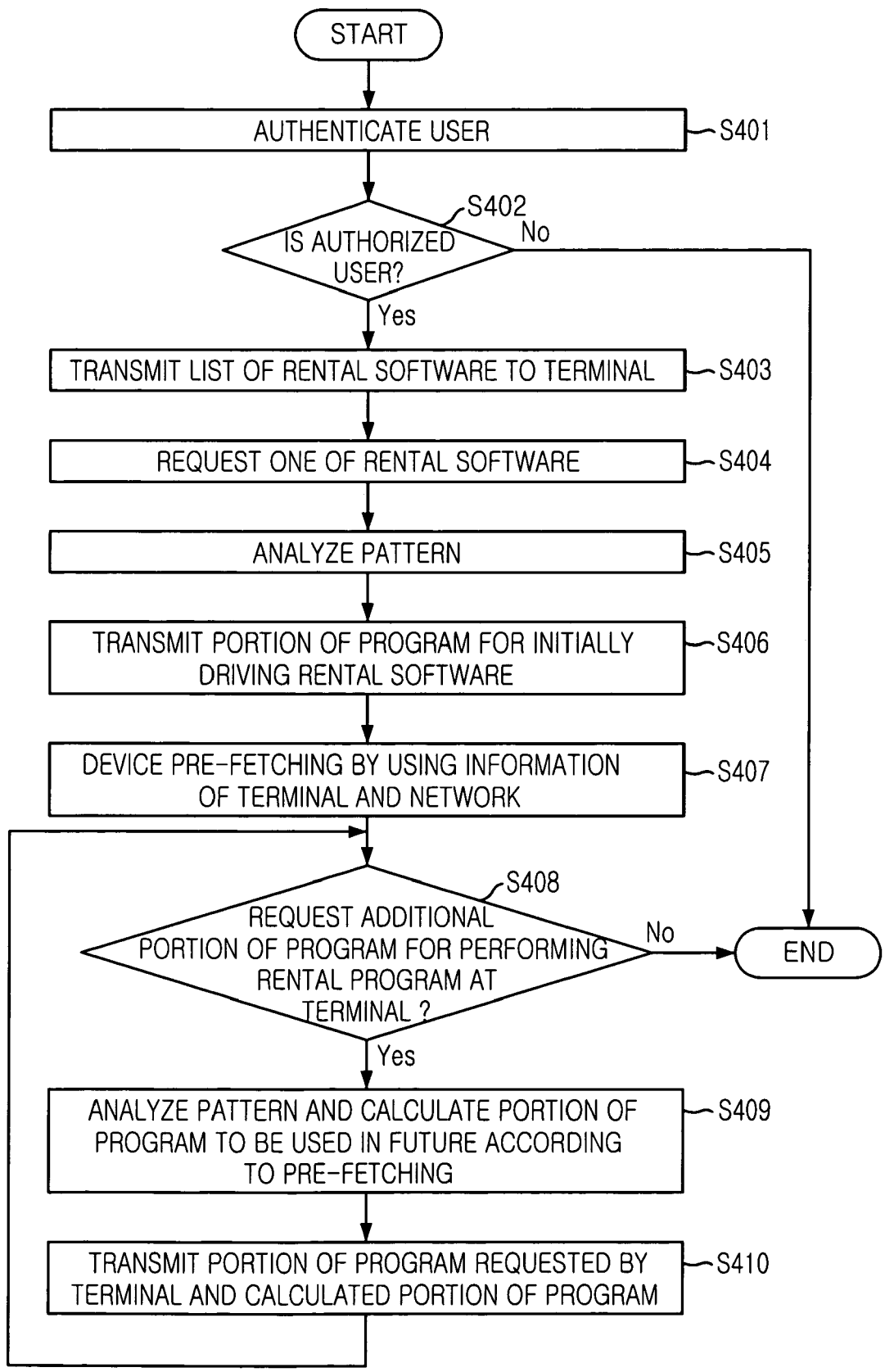

SYSTEM AND METHOD FOR PROVIDING RENTAL SOFTWARE, AND RENTAL SOFTWARE PROVIDING SERVER AND WIRELESS TERMINAL THEREOF

FIELD OF THE INVENTION

The present invention relates to a system and method for providing rental software, and a rental software providing server and a wireless terminal thereof; and, more particularly, to a rental software providing system and a method thereof, and its rental software providing server and a wireless terminal for effectively embodying a high-speed response time by transmitting a rental software to a wireless terminal using a prefetch scheme.

DESCRIPTION OF RELATED ARTS

Conventional application service providing (ASP) systems provide a rental software to a user computer by transmitting necessary program files of the rental software to the user computer connected to the ASP system through a network. By using the ASP system, the user can use a rental software without installing whole program on the user's computer.

However, since the conventional ASP systems were developed based on a wired network environment, a response time is seriously decreased when a user wants to use the rental software with a wireless terminal. It is because low bandwidth and slow speed transmission channels are provided in the wireless communication environment. In order to provide the rental software to the wireless terminal, the necessary program files of the rental software must be transmitted through such low bandwidth and slow speed wireless communication channel. Although, the size of the necessary program files is not big, it takes much longer time for requesting and downloading the necessary program files from the ASP system to the wireless terminal compared to a personal computer connected with a wired network. Furthermore, the wireless terminal generally has less computing power compared to a computer connected to a wired network. Therefore, there also requires much longer time to assemble the downloaded program files and to re-assemble the assembled program files suitable to be executed in the wireless terminal.

SUMMARY OF THE INVENTION

It is, therefore, an object of the present invention to provide a rental software providing system and a method thereof, and its rental software providing server and a wireless terminal for providing rental software with high-speed response time to a wireless terminal by using a prefetch scheme.

In accordance with an aspect of the present invention, there is provided a wireless terminal including: a network processing unit for communicating with a rental software providing server through a network; a terminal information collecting unit for collecting information about the wireless terminal including a storing capacity, a processing power, a size of a memory and networks currently connected to the wireless terminal; a user information collecting unit for storing user IDs and passwords, and collecting stored user information; a terminal managing unit for performing a user log-in operation by accessing the rental software providing server, and notifying changed information to the rental software providing server when the terminal information is changed; a rental software managing unit for managing the rental software to be executed in a virtual environment; a virtual file or register managing unit for managing the rental software to access target files or registers while the rental software is executed; and a cache managing unit for managing a cache storing partial modules of the rental software transmitted from the rental software providing server.

In accordance with an aspect of the present invention, there is also provided a rental software providing server, including: a network processing unit for communicating with a wireless terminal through a network; a user authenticating information storing unit for performing a user authentication operation and storing authenticated user information; a request managing unit for generally managing requests of rental software from the wireless terminal; a pattern analyzing and storing unit for analyzing a pattern of performing the rental software and storing the analyzed pattern; a terminal information extracting unit for extracting hardware information of the wireless terminal and wireless environment information of a wireless network connecting the wireless terminal and the rental software providing server; a prefetching managing unit for deciding a level of prefetching by using the extracted terminal information from the terminal information extracting unit, and requesting the pattern analyzing unit to decide partial programs to be prefetched based on the decided level of prefetching; a file transmitting unit for storing the rental software, and transmitting the requested partial program and the fetched partial program to be used in near future; an accounting information processing unit for storing accounting information and processing the stored accounting information; and an error recovering unit for storing all performed own operations to be recovered when errors are generated.

In accordance with still another aspect of the present invention, there is a provided a rental software providing system using a prefetching scheme, including: a wireless terminal for notifying a network connection state, and a hardware state of the wireless terminal to a rental software providing server in order to perform the prefetching scheme; and a rental software providing server for prefetching partial programs of a rental software to be used in the wireless terminal by using a prefetching managing unit and a pattern analyzer and transmitting the prefetched partial programs to the wireless terminal.

In accordance with further still anther aspect of the present invention, there is a provided a method of providing rental software using a prefetching scheme, including the steps of: performing a user authentication procedure in response to a user's request at a rental software providing server; transmitting a list of rental software to a wireless terminal when the user authentication operation is succeeded; requesting a predetermined rental software at the wireless terminal; notifying a pattern analyzer to start a pattern analysis by the rental software providing server in response to the request of the rental software, and transmitting partial programs to the wireless terminal to perform an initial operation; deciding a level of prefetching by extracting information about the wireless terminal and a network connecting the wireless terminal and the rental software providing server; determining where additional partial program is requested to the rental software providing server in order to perform the rental software in the wireless terminal; and calculating partial program to be used in near future according to the pattern analysis and the decided level of prefetching when additional partial program is requested, and transmitting the calculated partial program to be fetched to the wireless terminal.

BRIEF DESCRIPTION OF THE DRAWINGS

The above and other objects and features of the present invention will become better understood with regard to the following description of the preferred embodiments given in conjunction with the accompanying drawings, in which:

FIG. 4 is a flowchart showing a method of providing a rental software using a prefetch scheme in accordance with a preferred embodiment of the present invention.

DETAILED DESCRIPTION OF THE INVENTION

Hereinafter, an object of the present invention to provide a rental software providing system and a method thereof, and its rental software providing server and a wireless terminal in accordance with a preferred embodiment of the present invention will be described in more detail with reference to the accompanying drawings.

Figure 1:
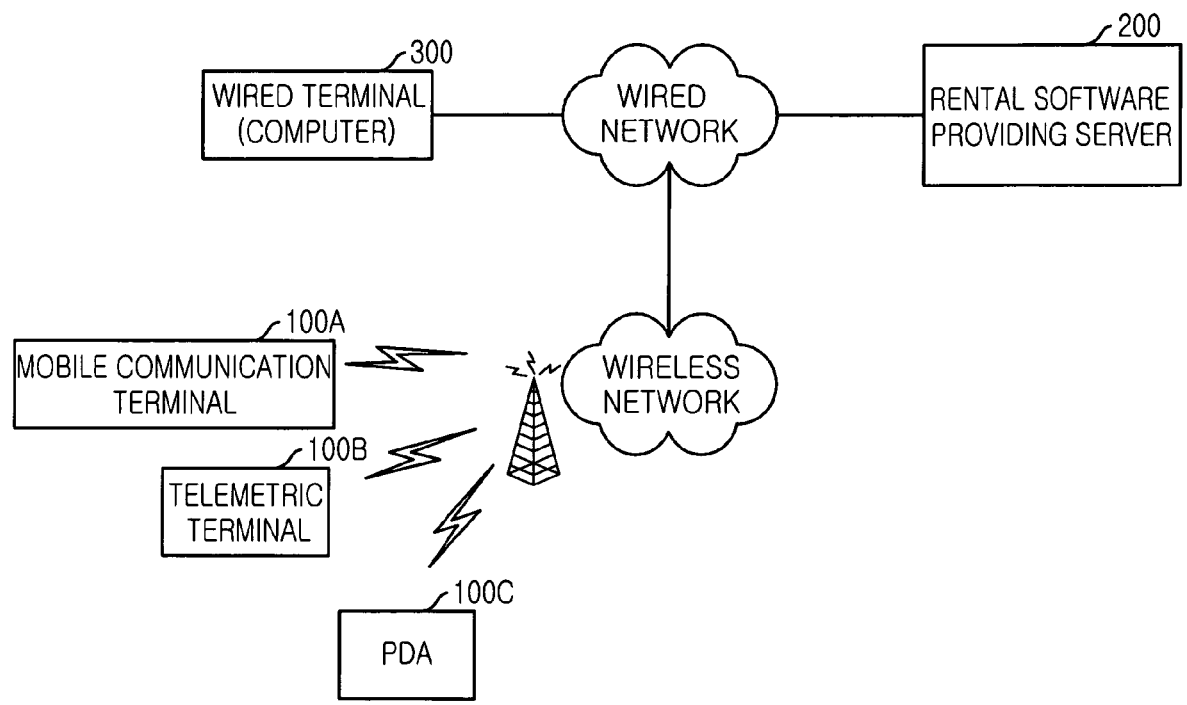
FIG. 1 is a block diagram illustrating a rental software providing system using a prefetch scheme in accordance with a preferred embodiment of the present invention.

FIG. 1 is a block diagram illustrating a rental software providing system using a prefetch scheme in accordance with a preferred embodiment of the present invention.

Referring to FIG. 1, the rental software providing system using a prefetch scheme includes: a wireless terminal 100 for providing a network connection state of a terminal and a state of a hardware to a rental software providing server 200 for providing a prefetch scheme; and a rental software providing server for prefetching program files to be used in near future from entire program files of a rental software and providing the prefectched program files to the wireless terminal 100 by using a prefetch manager and a pattern analyzer.

The wireless terminal 100 may be a mobile communication terminal 100A, a telematrix terminal 100B, and a personal data assistance 100C.

The wireless terminal 100 is connected to the rental software providing server 200 with a wireless communication network. When the wireless terminal 100 requests a rental software to the rental software providing server 200, the rental software providing server 200 dynamically transmits the rental software to the wireless terminal 100 in real time for the wireless terminal 100 to execute the rental software.

Herein, the wireless communication network may be various wireless communication networks such as CDMA 95 A/B, 1X, EVDO, and HPi. Also, the rental software providing server 200 may provide corresponding service to a wired terminal 300.

Hereinafter, the configuration of the rental software providing system according to the present invention will be explained in detail.

Figure 2:
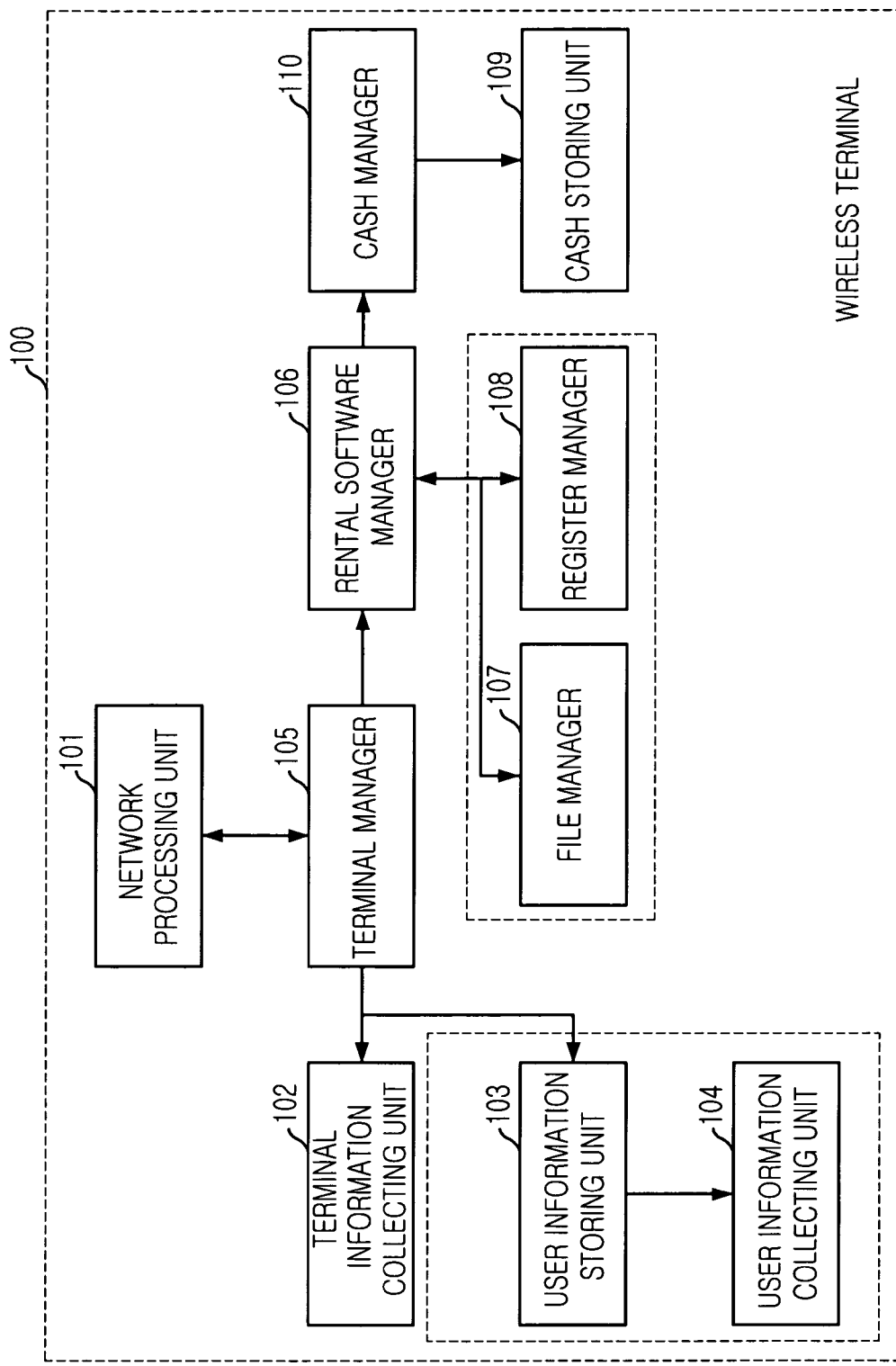
FIG. 2 is a block diagram illustrating a wireless terminal used in a rental software providing system using a prefetch scheme in accordance with a preferred embodiment of the present invention.

FIG. 2 is a block diagram illustrating a wireless terminal used in a rental software providing system using a prefetch scheme in accordance with a preferred embodiment of the present invention.

As shown in FIG. 2, the wireless terminal 100 according to the present embodiment includes a network processing unit 101 for communicating to the rental software providing server 200; a terminal information collecting unit 102 for collecting information of the wireless terminal 100 such as processing power of a central processing unit, a size of a memory, types of networks currently connected to the wireless terminal 100; a user information storing unit 103 for storing user IDs and passwords; a user information collecting unit 104 for collecting user information and storing the collected user information in the user information storing unit 103; a terminal manager 105 for performing a user login operation by accessing the rental software providing server 200, and noticing changed information to the rental software providing server 200 when the terminal information is changed; a rental software manager 106 for managing the rental software to be executed in virtual executing environment; a file manager 107 for managing to access required file while executing the rental software; a cache 109 for storing partial modules of the rental software transmitted from the rental software providing server 200; and a cache manager 110 for managing the cache 109.

Figure 3:
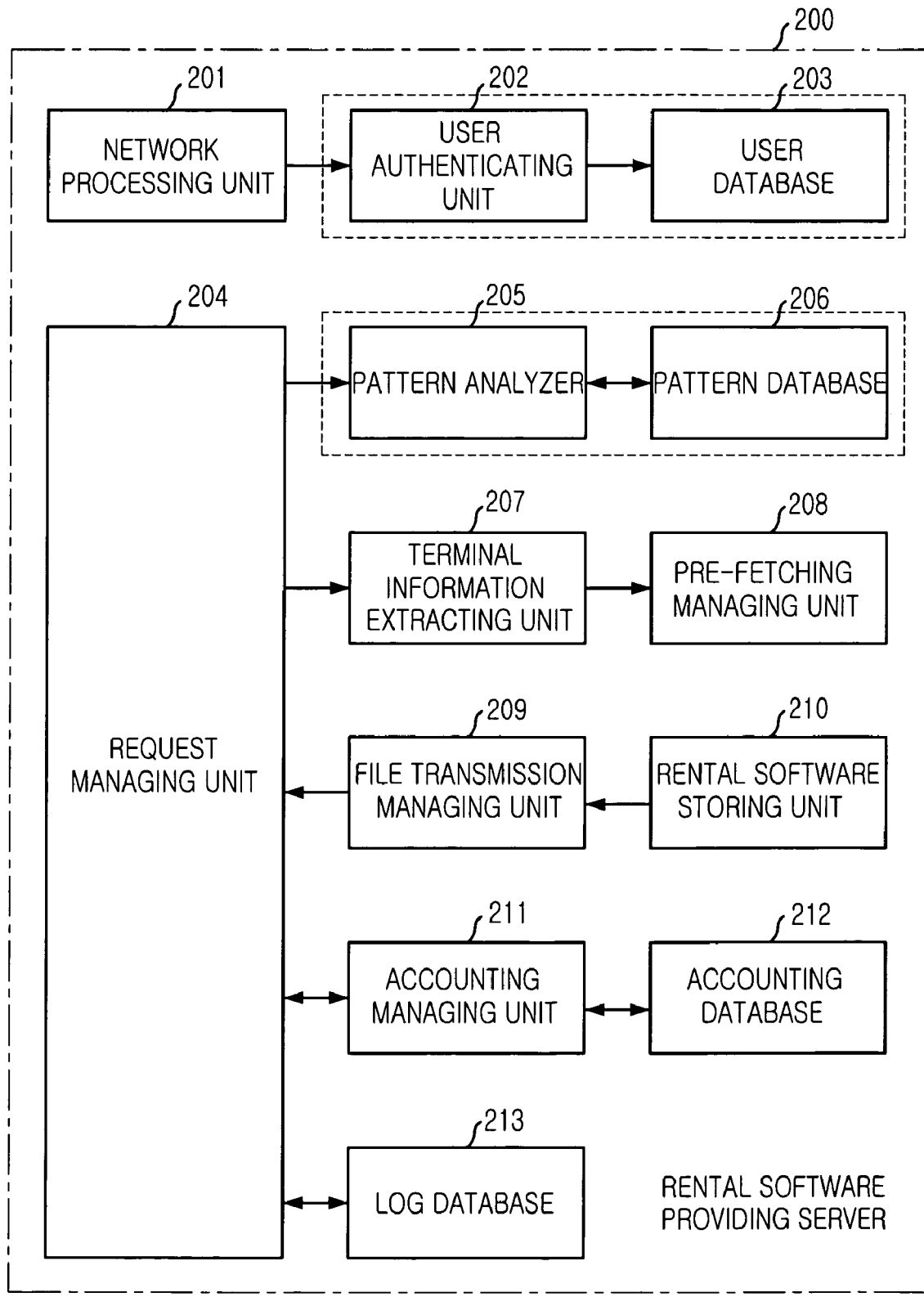
FIG. 3 is a block diagram illustrating a rental software providing server in a rental software providing system using a prefetch scheme in accordance with a preferred embodiment of the present invention.

FIG. 3 is a block diagram illustrating a rental software providing server in a rental software providing system using a prefetch scheme in accordance with a preferred embodiment of the present invention.

Referring to FIG. 3, the rental software providing server 200 according to the present embodiment includes a network processing unit 200 for communicating to the wireless terminal 100; a user authenticating unit 202 for authenticating a user; a user database 203 for storing user information authenticated by the user authenticating unit 202; a request managing unit 204 for generally managing requests of rental software from the wireless terminal 100; a pattern analyzer 205 for analyzing a performing pattern of a rental software; a pattern database 206 for storing the analyzed pattern by the pattern analyzer 205; a terminal information extracting unit 207 for extracting hardware information of the wireless terminal 100 and wireless environment information between the wireless terminal and the server; a prefetching managing unit 208 for determining a level of prefetching of a rental software using the extracted terminal information through the terminal information extracting unit 207, and requesting to determine a partial program to be prefetched to the pattern analyzer 205 according to the determined prefetching level when the wireless terminal 100 requests the partial program of the rental software; a rental software storing unit 210 for storing the rental software; a file transmission managing unit 209 for transmitting the requested partial program of the rental software and the prefetched program to be used in near future; an accounting managing unit 211 and an accounting database 212 for storing accounting information and processing the stored accounting information; and a log database 213 for storing all operations of the rental software providing server 200 to recover the system when errors are occurred in the system.

The rental software providing server 200 uses the hardware information of the wireless terminal where the rental software is transmitted and a transmission capacity and speed of a network connecting the wireless terminal and the server to decide the level of prefetching.

The prefetching managing unit 208 is a module deciding the level of prefetching, that is, how many partial programs are prefetched. The prefetching managing unit 208 decides the level of prefetching based on a processing power of the wireless terminal and a wireless environment. Herein, the level of the prefetching means a size of partial program to be transmitted to the wireless terminal 100.

Generally, the wireless environment between the wireless terminal 100 and the rental software server 200 is dynamically changed. For example, the wireless environment is dynamically changed to CDMA 95A/B, 1X, EVDO, or HPi. Transmission speeds of wireless environments are diversity from 9.6 Kbps to 12 Mbps.

Accordingly, the wireless terminal 100 in low speed wireless environment needs more prefetched file of rental software compared to a wireless terminal in high speed wireless environment. Also, a processing power and a storing capacity are also various according to a type of a wireless terminal. Therefore, the level of prefetching must be decided according to the processing power and the storing capacity of the wireless terminal 100. For example, if a previously downloaded partial program stored in the cache is deleted in order to store newly prefetched partial program, and if the deleted partial program constantly required to be performed in near future, the wireless terminal 300 will spend processing power and resources to repeatedly perform for downloading the files from the rental software providing server. Accordingly, sufficient work space must be secured for prefetched program before downloading the prefetched program, and the secured work space must be used as a cache to store the prefetched data. Therefore, the hardware information is required.

Hereinafter, operations of the rental software providing system using a prefetch scheme according to the present embodiment will be explained with reference to FIG. 4.

FIG. 4 is a flowchart showing a method of providing a rental software using a prefetch scheme in accordance with a preferred embodiment of the present invention.

Referring to FIG. 4, a user of the wireless terminal accesses a rental software providing server after performing a user authenticating procedure at step S401.

And then, it determines whether the user authentication procedure is success or not at step S402. If the user authentication procedure is success, a list of rental software to the wireless terminal 100 at step S403. The user of the wireless terminal 100 requests one of rental software in the transmitted list to the rental software providing server 200 at step S404.

Accordingly, the rental software providing server 200 notices the pattern analyzer to perform a pattern analysis at step S405, and a partial program of the request rental software is transmitted to the wireless terminal 100 in order to perform initially operation at step S406.

At the same time, a level of prefetching is decided by using extracting network information and wireless terminal information, which are information transmitted by the wireless terminal 200 to the rental software providing server 200 at step S407.

In order to perform the rental software in the wireless terminal 100, it determines whether additional partial program is requested to the rental software providing server 200 or not at step S408. If there is a request for additional partial program, the rental software providing server 200 calculates partial program to be prefetched, and transmits the requested additional program and the prefetched program to the wireless terminal 100 in steps S409 and S410. If there no request, the rental software providing service is terminated.

The pattern analyzer may perform the pattern analysis by using various algorithms such as "Markov algorithm ". Additionally, information about partial program required by the wireless terminal 100 is used to analyze the rental software pattern. Such a process is continuously performed until the wireless terminal 100 requests additional partial program to the rental software providing server 200.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the rental software providing system according to the present invention can provide a rental software providing service to the wireless terminal with high-speed response time by prefetching partial program of a requested rental software, and transmitting the prefetched program to the wireless terminal.

The present application contains subject matter related to Korean patent application No. KR 2004-0105003, filed in the Korean patent office on Dec. 13, 2004, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A rental software providing server, having instructions, the instructions comprising:
   a network processing unit for communicating with a wireless terminal through a network;
   a user authenticating information storing unit for performing a user authentication operation and storing authenticated user information,
   a request managing unit for managing requests of rental software from the wireless terminal;
   a pattern analyzing and storing unit for analyzing a pattern of performing the rental software and storing the analyzed pattern;
   a terminal information extracting unit for extracting hardware information of the wireless terminal and wireless environment information of a wireless network connecting the wireless terminal and the rental software providing server;
   a prefetching managing unit for deciding a level of prefetching by using the extracted terminal information from the terminal information extracting unit, and requesting the pattern analyzing unit to decide partial programs to be prefetched based on the decided level of prefetching;
   a file transmitting unit for storing the rental software, and transmitting a requested partial program and a fetched partial program to be used subsequently;
   an accounting information processing unit for storing accounting information and processing the stored accounting information; and
   an error recovering unit for storing all performed own operations to be recovered when errors are generated,
   wherein the pattern analyzer unit applies an algorithm to the partial programs to be prefetched,
   wherein the algorithm applied to the prefetched partial program is configured for maximizing the decided prefetched partial program to be prefetched according to the extracted terminal information and transmission speed of the respective wireless environment, which the extracted terminal information is operating at between the rental software providing server and the wireless terminal, and
   wherein the extracted terminal information varies based on a processing power and storing capacity of the respective terminal information of the wireless terminal receiving the prefetched partial programs.

2. The rental software providing sewer as recited in claim 1, wherein the prefetching managing unit secures sufficient workspace for the rental software to be operated when the prefetching a partial program, and the secured workspace is used as a cache storing unit for storing data to be prefetched.

3. The rental software providing server as recited in claim 1, wherein the rental software providing server uses the hardware information of the wireless terminal and transmission speed and capacity of a network connecting the wireless terminal and the rental software providing sewer.

4. A rental software providing system using a prefetching scheme, comprising:
   a wireless terminal for notifying a network connection state, and a hardware state of the wireless terminal to a rental software providing server in order to perform the prefetching scheme; and
   a rental software providing server for prefetching partial programs of a rental software to be used in the wireless terminal by using a prefetching managing unit and a pattern analyzer unit and transmitting the prefetched partial programs to the wireless terminal,
   wherein the pattern analyzer unit applies an algorithm to the partial programs to be prefetched that is configured for transmitting the maximum amount prefetched partial programs to the wireless terminal based on the network connection state and the hardware state of the wireless terminals,
   wherein the network connection state is the transmission speed, which the wireless terminal is operating at between the rental software providing server and the wireless terminal, and
   wherein the hardware state of the wireless terminal varies based on a processing power and storing capacity of the respective hardware state of the wireless terminal receiving the prefetched partial programs.

5. The rental software providing system using a prefetching scheme as recited in claim 4, wherein the wireless terminal comprises:
   a network processing unit for communicating with a rental software providing server through a network;
   a terminal information collecting unit for collecting information about the wireless terminal including a storing capacity, a processing power, a size of a memory and networks currently connected to the wireless terminal;
   a user information collecting unit for storing user IDS and passwords, and collecting stored user information;
   a terminal managing unit for performing a user log-in operation by accessing the rental software providing server, and notifying changed information to the rental software providing sewer when the terminal information is changed;
   a rental software managing unit for managing the rental software to be executed in a virtual environment;
   a virtual file or register managing unit for managing the rental software to access target files or registers while the rental software is executed; and
   a cache managing unit for managing a cache storing partial modules of the rental software transmitted from the rental software providing server.

6. The rental software providing system using a prefetching scheme as recited in claim 4, wherein the rental software providing server comprises:
   a network processing unit for communicating with a wireless terminal through a network;
   a user authenticating information storing unit for performing a user authentication operation and storing authenticated user information;
   a request managing unit for generally managing requests of rental software from the wireless terminal;
   a pattern analyzing and storing unit for analyzing a pattern of performing the rental software and storing the analyzed pattern;
   a terminal information extracting unit for extracting hardware information of the wireless terminal and wireless environment information of a wireless network connecting the wireless terminal and the rental software providing server;
   a prefetching managing unit for deciding a level of prefetching by using the extracted terminal information from the terminal information extracting unit, and requesting the pattern analyzing unit to decide partial programs to be prefetched based on the decided level of prefetching;
   a file transmitting unit for storing the rental software, and transmitting the requested partial program and the fetched partial program to be used subsequently;
   an accounting information processing unit for storing accounting information and processing the stored counting information; and
   an error recovering unit for storing all performed own operations to be recovered when errors are generated.

7. A method of providing rental software using a prefetching scheme, comprising:
   performing a user authentication procedure in response to a user's request at a rental software providing server;
   transmitting a list of rental software to a wireless terminal when the user authentication operation is succeeded;
   requesting a predetermined rental software at the wireless terminal;
   notifying a pattern analyzer unit to start a pattern analysis by the rental software providing sewer in response to the request of the rental software, and transmitting partial programs to the wireless terminal to perform an initial operation;
   deciding a level of prefetching by extracting information about the wireless terminal and a network connecting the wireless terminal and the rental software providing server;
   determining where additional partial program is requested to the rental software providing server in order to perform the rental software in the wireless terminal; and
   calculating partial program to be used subsequently according to the pattern analysis and the decided level of prefetching when additional partial program is requested, and transmitting the calculated partial program to be fetched to the wireless terminal,
   wherein the pattern analyzer unit applies an algorithm to the partial programs to be prefetched that is configured for maximizing the decided prefetched partial program to be prefetched according to on the extracted information about the wireless terminal and a network connecting the wireless terminal and the rental software providing server,
   wherein the network connecting the wireless terminal and the rental software providing server is the transmission speed, which the wireless terminal is operating at between the rental software providing server and the wireless terminal, and
   wherein the extracted terminal information varies based on a processing power and storing capacity of the respective terminal information of the wireless terminal receiving the prefetched partial programs.

* * * * *

UNITED STATES PATENT AND TRADEMARK OFFICE
CERTIFICATE OF CORRECTION

PATENT NO.       : 7,668,783 B2  
APPLICATION NO. : 11/191592  
DATED            : February 23, 2010  
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Twenty-eighth Day of December, 2010

David J. Kappos  
*Director of the United States Patent and Trademark Office*